United States Patent
Kappel et al.

(10) Patent No.: US 7,082,609 B2
(45) Date of Patent: Jul. 25, 2006

(54) META APPLICATION SYSTEM AND METHOD

(75) Inventors: Jochen Kappel, Vence (FR); Josef Markgraf, Goldbach (DE); Michael Meadows, Sundbyberg (SE)

(73) Assignee: Schlumbergersema Telekom GmbH & Co. KG (DE)

( * ) Notice: Subject to any disclaimer, the term of this patent is extended or adjusted under 35 U.S.C. 154(b) by 465 days.

(21) Appl. No.: 09/823,892

(22) Filed: Mar. 31, 2001

(65) Prior Publication Data

US 2002/0049863 A1 Apr. 25, 2002

Related U.S. Application Data

(60) Provisional application No. 60/193,422, filed on Mar. 31, 2000.

(30) Foreign Application Priority Data

Mar. 31, 2000 (DE) .............................. 001 06 948

(51) Int. Cl.
*G06F 9/44* (2006.01)
(52) U.S. Cl. ...................... 719/315; 719/316
(58) Field of Classification Search ................ 719/315, 719/316, 331, 330; 707/103 R, 103 X–103 Z; 717/114, 116; 709/203, 219
See application file for complete search history.

(56) References Cited

U.S. PATENT DOCUMENTS

| | | | | |
|---|---|---|---|---|
| 4,627,019 A | * | 12/1986 | Ng ................................ 707/8 |
| 5,339,438 A | * | 8/1994 | Conner et al. ............... 717/153 |
| 5,375,234 A | * | 12/1994 | Davidson et al. ........... 707/202 |
| 5,375,237 A | * | 12/1994 | Tanaka et al. ............... 707/102 |
| 5,448,726 A | * | 9/1995 | Cramsie et al. ......... 707/103 R |

(Continued)

FOREIGN PATENT DOCUMENTS

WO    WO 00 07128 A    2/2000

OTHER PUBLICATIONS

A. Wong et al, "An Automatic Software Generation Approach for Easier Distributed Programming", IEEE, 1996, pp. 1553-1558.*

(Continued)

*Primary Examiner*—William Thomson
*Assistant Examiner*—George L. Opie
(74) *Attorney, Agent, or Firm*—Dority & Manning, P.A.

(57) ABSTRACT

The present invention provides a system and method for providing dynamic definition of an application object. In architecture, the system includes an application dictionary that contains information about the application object, and a class dictionary entry in the application dictionary that defines meta information about the application object. A modifier modifies the application dictionary to modify a definition of the application object. The present invention can also be viewed as a method for providing dynamic definition of an application object. The method operates by providing an application dictionary that contains information about the application object, and a class dictionary entry that defines meta information about the application object. The application dictionary is modified to modify a definition of the application object.

8 Claims, 6 Drawing Sheets

U.S. PATENT DOCUMENTS

| | | | |
|---|---|---|---|
| 5,463,769 A * | 10/1995 | Tate et al. | 719/315 |
| 5,659,751 A | 8/1997 | Heninger | 395/685 |
| 5,710,920 A * | 1/1998 | Maruyama et al. | 707/103 R |
| 5,873,088 A * | 2/1999 | Hayashi et al. | 707/100 |
| 5,920,725 A | 7/1999 | Ma et al. | 395/712 |
| 5,995,753 A * | 11/1999 | Walker | 717/108 |
| 5,995,975 A * | 11/1999 | Malcolm | 707/103 R |
| 6,016,394 A * | 1/2000 | Walker | 717/104 |
| 6,032,198 A * | 2/2000 | Fujii et al. | 719/328 |
| 6,366,917 B1 * | 4/2002 | St. John Herbert, III | 707/100 |

OTHER PUBLICATIONS

Boyd: Customer Billing Technology and Issues—Annual Review of Communications International Engineering Consortium, Bd. 47, 1994, Seiten 800-806, XP000455398, Chicago, IL, US.

Kleissner: Enterprise Objects Framework—Sigmod Record, Bd. 24, Nr. 2, Jun. 1, 1995, Seiten 455-459, XP002047857, New York, NY, US.

* cited by examiner

META APPLICATION SYSTEM AND METHOD

CLAIM OF PRIORITY AND CROSS REFERENCE TO RELATED APPLICATIONS

This application claims the benefit of U.S. Provisional Patent Application entitled "Targys System," filed Mar. 31, 2000 and having Ser. No. 60/193,422, and copending U.S. Utility Patent Application entitled "Customer Care and Billing System," having U.S. Ser. No. 09/819,446, filed on Mar. 28, 2001, which also claims priority to German Patent Application No. 00106948.3-2201, entitled "Customer Care and Billing System," filed Mar. 31, 2000, all of the foregoing of which are now pending and are incorporated herein by reference.

FIELD OF THE INVENTION

The present invention generally relates to computers and computer software, and more particularly, to a Meta application layer system and method.

DESCRIPTION OF RELATED ART

Typically, today's computing and networking environments are complex and geographically distributed, and in the future they will be even more so. This complexity is due to the ever increasing changes caused by the increasing development of new technologies. With the development of these new technologies, it is an ever-increasing burden on application developers to not only provide generic interfaces for communication with other applications, but to also provide generic facilities for describing application facilities for each instance of an application, thus allowing dynamic definition of the behavior of an application. With this increased flexibility, there also is a need for insulating these generic applications from intricacies of the communication so that they can only be implemented via the use of standard interfaces. This insulation would not only enhance security, but it would provide for increased efficiency to provide modifications or extensions.

Thus, a heretofore unaddressed need exists in the industry to address the aforementioned deficiencies and inadequacies.

SUMMARY OF THE INVENTION

The present invention provides a system and method for providing dynamic definition of an application object Briefly described, in architecture, the system of the preferred embodiment can be implemented as follows. Providing an application dictionary that contains information about the application object, and a class dictionary entry in the application dictionary that defines meta information about the application object. A modifier modifies the application dictionary to modify a definition of the application object.

The present invention can also be viewed as providing a method for providing dynamic definition of an application object. In this regard, the preferred method can be broadly summarized by the following steps. The method operates by: 1) providing an application dictionary that contains information about the application object; 2) providing a class dictionary entry that defines meta information about the application object; and 3) modifying the application dictionary to modify a definition of the application object.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings.

DETAILED DESCRIPTION OF THE PREFERRED EMBODIMENT

Figure 1:
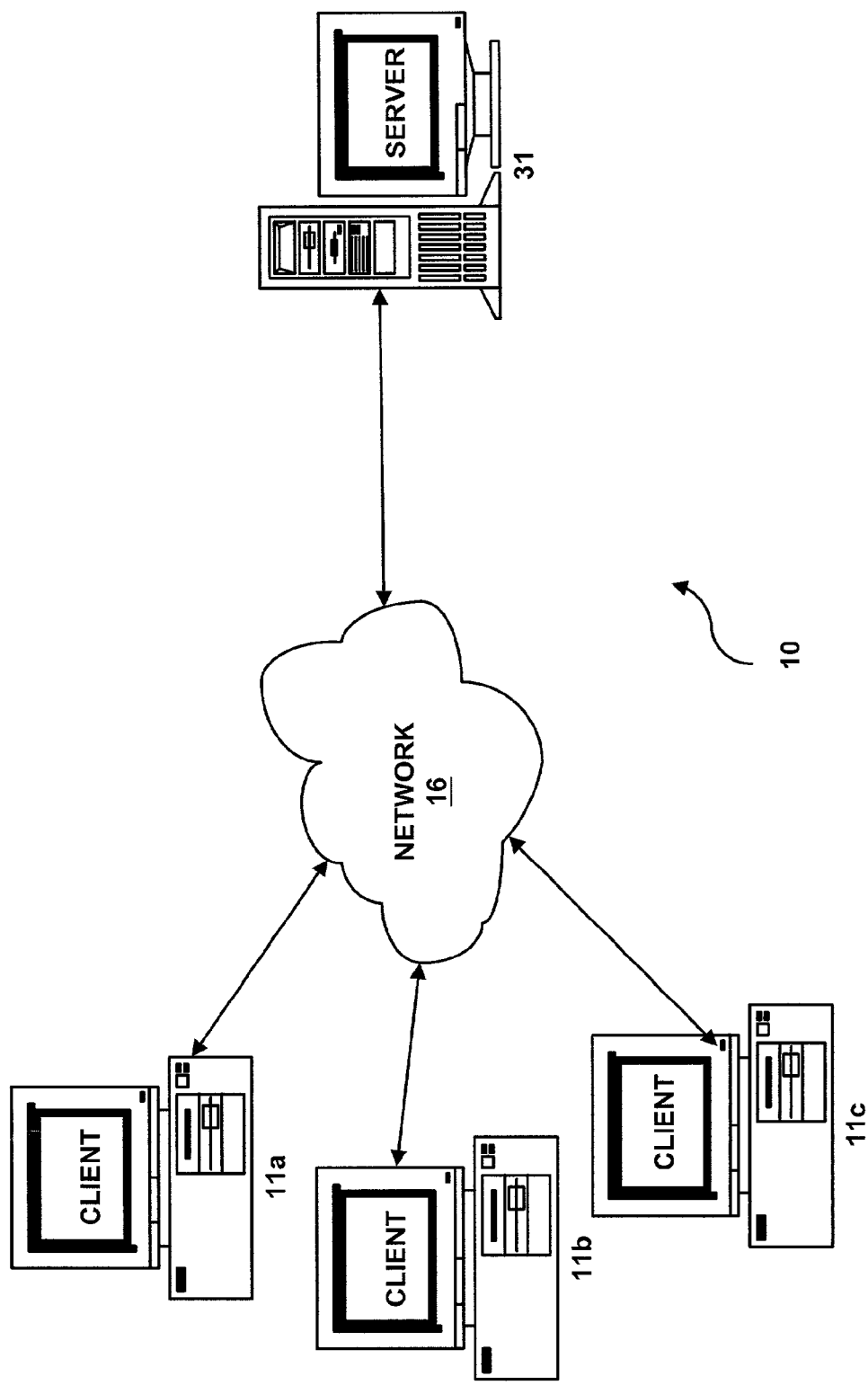
FIG. 1 is a block diagram illustrating an example of a network in which the Meta application system and method may be implemented.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

A component framework provides Meta-information in the "Meta-Application Dictionary" per component and per server. There is one dictionary per component, and another dictionary per (deployed) server. In the existing version of the framework, the Meta-information is stored in an (unreadable) serialized file. This will be changed so that the information is stored in a format, e.g., XML, that can be easily modified (with a simple text editor).

Component pertinent information in the dictionary (-ies) concern information that allows a component to communicate with other components (i.e. a list of used foreign components, and their names). In this way, a component can bind to required foreign components, for example, to acquire a link to the factory in the external component or to invoke services there.

The Meta application tier and layer in the technical framework consists of classes that allow the definition of information concerning aspects of application objects and domain objects. Such classes make it possible to dynamically configure aspects of business and application level objects on a Metal level. Such aspects include volatile application, global information, naming of classes, format masks, and the links for attributes. These aspects occur whether or not certain attributes are mandatory and where the sequence and elements of the method are used for object validation. Also included in the Meta application tier and layer is information that maps graphical user interface specific classes to application and domain classes.

The framework allows the definition of a large amount of information about an application, its classes and the attributes in the class. This information is defined in the Meta application dictionary that allows dynamic configuration of application information and processing on the Meta level within the technical framework.

Referring now to the drawings, wherein like reference numerals designate corresponding parts throughout the drawings, FIG. 1 is a block diagram that portrays a diagram of a network that illustrates the flexibility, expandability, and platform independence in which the present technical framework 41 may be implemented. Referring to FIG. 1, a series of client computers 11a, 11b, 11c are connected to a server computer 31 via a network 16. The network 16 may be, for example, but is not limited to, a dial-in network, local area network (LAN), wide area network (WAN), public switched telephone network (PSTN), Intranet, Internet, Ethernet type networks, and the like. The client computers 11a, 11b, 11c (hereinafter, 11) may be located within a LAN, WAN, PSTN, Intranet, Internet, Ethernet type networks, or the like. It should be noted that the number of client computers and server computers may differ from the number presently illustrated. Further, it should also be noted that, that the preferred embodiment of the invention describes the functionality provided by a server computer 31.

Figure 2:
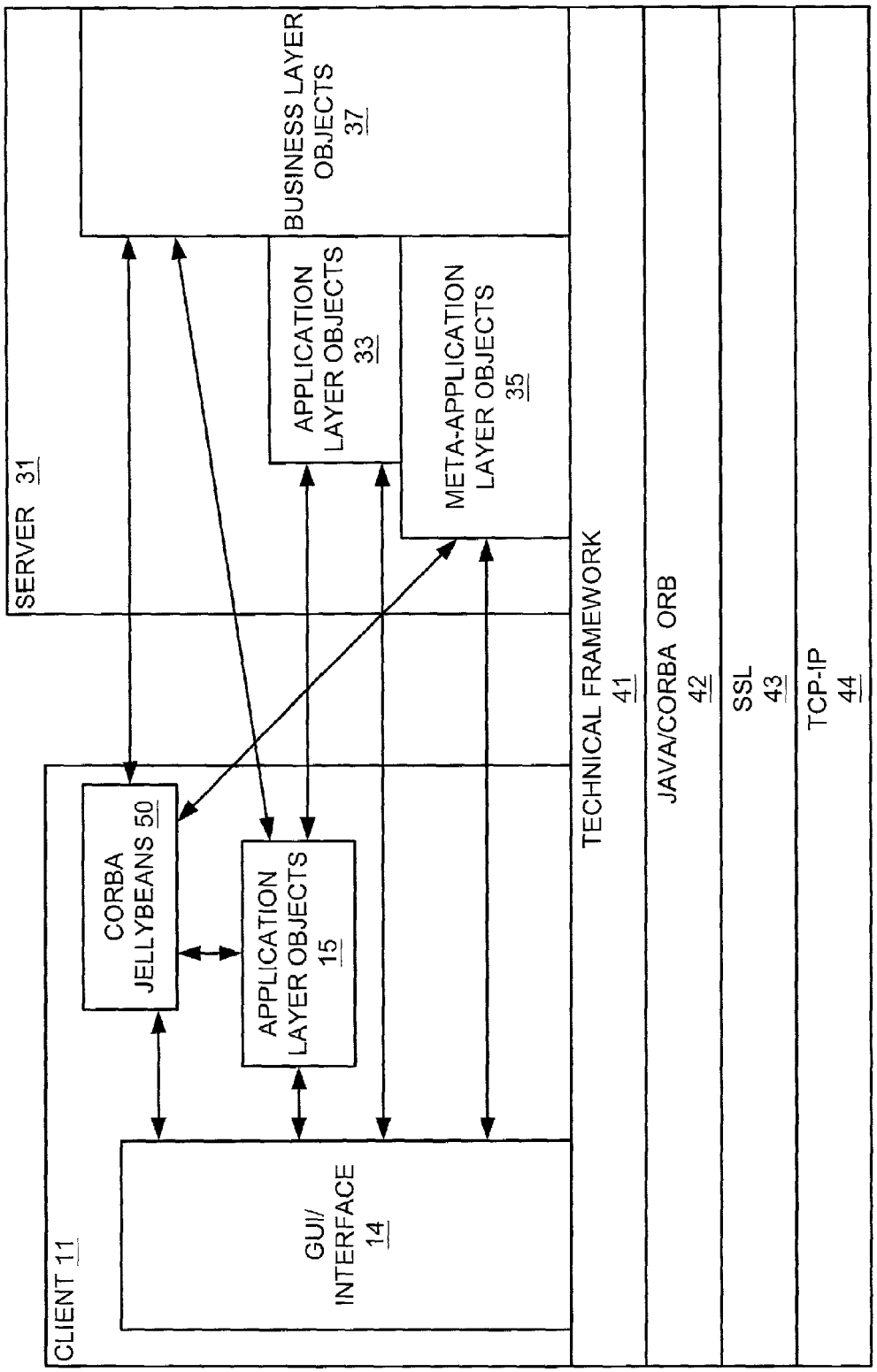
FIG. 2 is a block diagram illustrating an example of the technical architecture that portrays the interaction of the client with the server utilizing the framework of the present invention.

Illustrated in FIG. 2 is a block diagram of an example of the interaction between the client 11 and the server 31, utilizing the technical framework 41 containing the Meta application layer functionality of the present invention. As shown, the client 11 contains a number of components that need to communicate with components in application server 31. This communication of components within the client 11 and server 31 occur through the communications middleware. Communications middleware includes technical framework 41, the CORBA layer 42, which is the common object request broker architecture, the secured socket links layer 43, and the TCP-IP layer 44.

Typically, as shown in FIG. 2, the system architecture also includes a GUI interface 14 and application layer objects 15, as well as CORBA jellybeans 50 components. These components require communication with the application server 31 components, consisting of Meta application layer objects 35, application layer objects 33, and business layer objects 37. We will now discuss the Meta application layer and tier that exist within the technical framework 41 hereafter, with regards to FIGS. 3, 4, 5 and 6.

Figure 3:
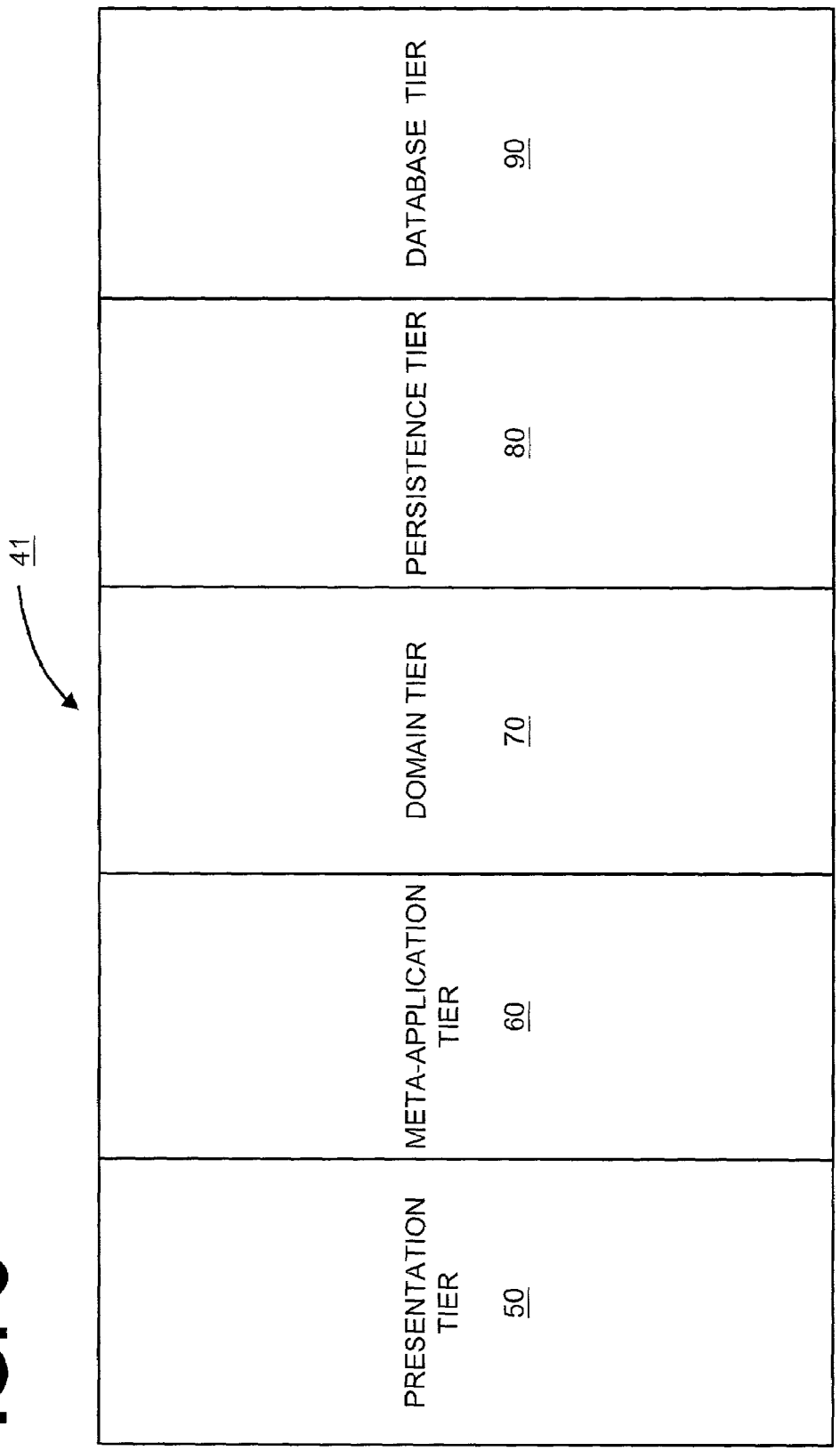
FIG. 3 is a block diagram of an example of the horizontal view of the logical architecture of the framework that demonstrates partitioning behavior using multi-tier division.

Illustrated in FIG. 3 is a block diagram illustrating an example of the horizontal view of the technical framework architecture 41. Within the horizontal view of the technical framework architecture 41 are the presentation tier 50, Meta application tier 60, domain tier 70, the persistence tier 80 and the database tier 90.

The presentation tier 50 exists to present the behavior and information of an application. The elements of the presentation tier 50 are concerned with the representation of the navigation through and the manipulation of information. This information maps to a server element that represent distance objects and larger application wrappers of business objects, as well as objects that are necessary for an application. Thus, while the presentation standards concern the presentation tier 50 only, the facilities in the application server 31 dictate what can be performed. The application server 31 framework presupposes the use of object oriented user interface and provides facilities accordingly. The elements in the presentation tier 50 can and should be used to use the descriptive information provided in the Meta application instances to define the aspects of how business objects and their attributes should be viewed and used. This Meta application information provides a layer of insulation between the presentation objects and the application or business objects, according to the needs of the specific installation.

The Meta application tier 60 can be best described as a class level layer. The Meta application tier's 60 primary purpose is thus descriptive or declarative, i.e., the classes here allow a means for an application to describe and change aspects of itself. The Meta application tier 60 exists for bio generic facilities for describing application facilities of an application, for instance, and thus allowing dynamic definition of the behavior of the application.

The Meta application tier 60 in the technical framework 41 consists of classes that allow the definition of information concerning the aspects of an application objects and domain objects. Such classes make it possible to dynamically configure aspects of the business objects residing in the business layer objects 37 (FIG. 2) on a Meta level. Such aspects include volatile application, global information, naming of classes, format masks and links of attributes, whether or not the attributes are mandatory.

It also includes the sequence and elements of methods used for object validation. The Meta application tier 60 can also include information that maps GUI-specific classes to an application and domain classes. Much of the information here will be based on Meta information obtained through Java introspective mechanisms or the interface repository of the object request broker.

The Meta application tier 60 is a tier of an application with which the presentation tier 50 primarily interacts. The same is true for other applications. The Meta application tier 60 contains classes and interfaces that represent applications and classes that "package" application component behavior. The Meta application tier 60 can also be said to contain instances of the Meta application classes.

The domain tier 70 is a tier where the business object classes for a specific application domain will reside. The domain tier 70 exclusively contains classes that model the business domain of an application. Thus, the development effort for application developers will be mostly concerned with the domain tier 70. Domain tier 70 will almost exclusively be composed of abstract domain classes from which all business objects inherit behavior. In addition, the primary class for handling collection of business objects resides in the domain tier 70. In addition, the domain tier 70 will also contain certain framework domain objects that concern specific framework domains, such as security. The domain tier 70, as its name implies, will contain domain classes. Each will be a subclass of an abstract layer above. These classes should model stable, nonchangeable behavior of the central classes of a problem domain. All volatile behavior that concerns a domain class should be encapsulated in classes that are pushed into the Meta application tier 60 that are used by the domain classes.

The persistence tier 80 is a tier that encapsulates the interaction between the domain and other persistence objects and a persistence store. The persistence tier 80 contains a behavior that provides persistence for objects, their storage and retrieval. Ideally, this should encapsulate the use of chosen persistence mapping tools. The persistence tier 80 primarily consists of classes provided by the chosen object relation mapper for Java. It also includes session classes that manage a user's session within the database, as well as wrapped classes for various object persistence related behaviors. The persistence tier 80 also will include business object specific persistence mapping objects, i.e., the objects used to define how the store retrieves specific business objects from a database, such as, but not limited to, Oracle™. These business object specific persistence mapping objects should be completely transparent to developers not concerned with persistence, but should of course, be defined by those who perform the mapping for the business object.

The database tier 90 provides classes and interfaces for interaction with a database (not shown).

Figure 4:
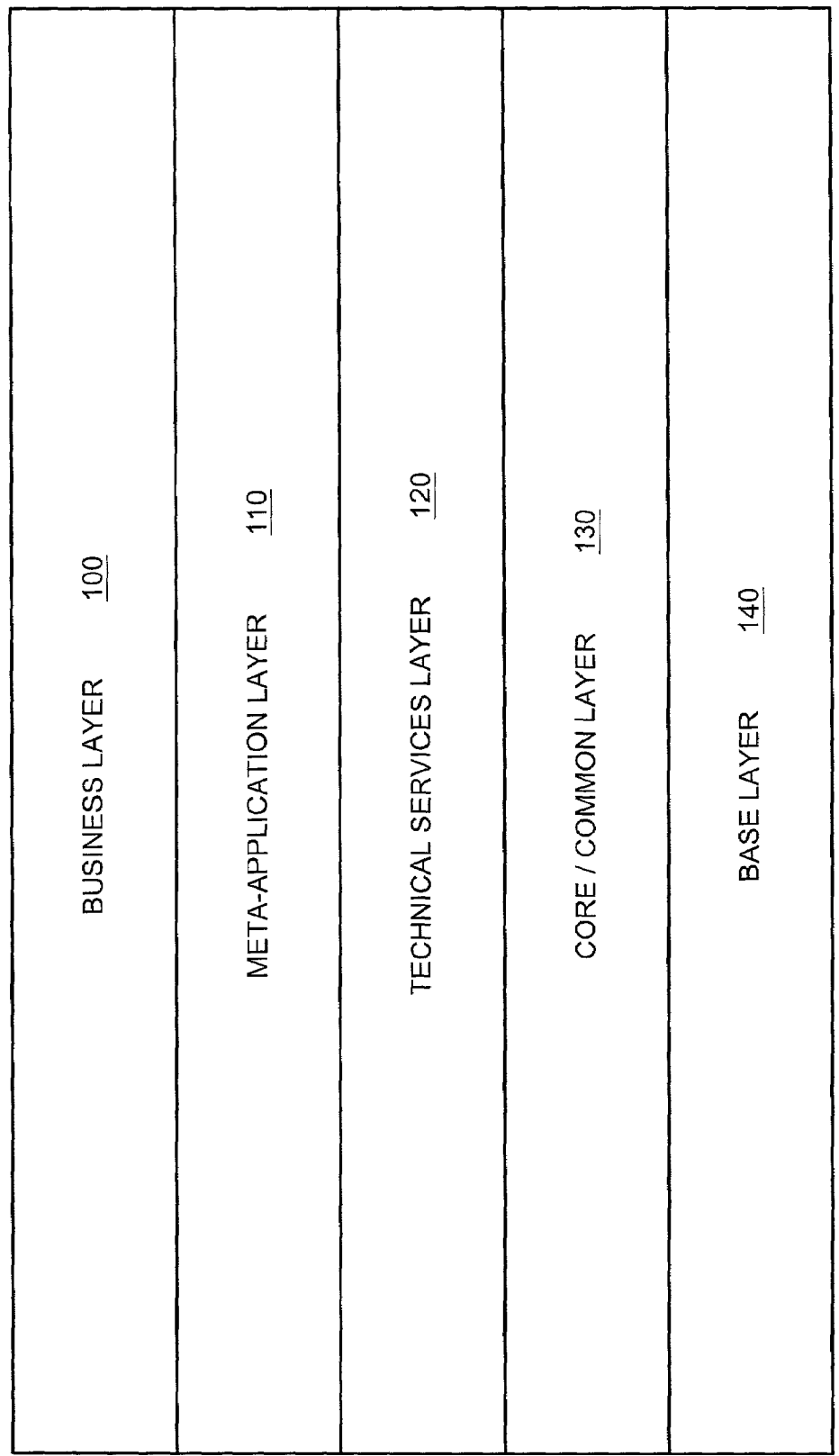
FIG. 4 is a block diagram of an example of the vertical view of the logical architecture of the technical framework demonstrating the partitioning of behavior using multi-layer division.

Illustrated in FIG. 4 is a block diagram of an example of the vertical view of the technical framework 41 (FIG. 2). The vertical view of the technical framework 41 shows partitioning of behavior using layers with increasing abstraction. The vertical view of the technical framework 41 divides behavior into layers that insulate more abstract layers from the intricacies of the lower layer. The OS system software and other low level concerns are isolated in the lower layers. Java and the upper layers provide a high level abstraction for application development.

The vertical layers of the technical framework 41 consist of the business layer 100, the Meta application layer 110, the technical services layer 120, the core/common layer 130 and the base layer 140. The business layer 100 is by definition not part of the technical framework 41, but is where the domain specific classes for each application component lies. Furthermore, most aspects of the system administration occur in the business layer 100 and can be considered a form of business layer, i.e., handling of the domain of the technical framework 41. This includes administration of GUIs for administrating aspects of the framework services, i.e., security and Meta application facilities and server monitor tools.

The Meta application layer 110 contains those classes that link together the behavior in the technical component layer to allow interaction with an application or component. The Meta application layer 110 thus represents an application on an abstract level, and instances of these classes are used in the interaction with a real application, such as a server as the fundamental interaction instance to a server for a client. The Meta application layer 110 contains those classes that represent the highest level abstraction in the technical framework 41.

The Meta application tier 60 and Meta application 110 combine to allow the definition of a large amount of information about an application, its classes and attributes in the classes. This information is defined in a Meta application dictionary that allows a dynamic configuration of the application information and processing on a Meta level. An illustration of an example of the Meta application dictionary is herein defined in further detail with FIG. 6.

The technical services layer 120 contains those classes that together implement what can be called the technical services and maps these to the facilities provided by the higher object request broker services. The higher object request broker services include security, error handling, transaction and concurrent control, interface control, persistence support, and the fundamental classes of the Meta application definition.

The common core/common layer 130 contains specific abstraction of classes in the base layer and the custom classes that provide generic facilities for all the layers and tiers. Items included in the core/common layer 130 are object request broker collections, iteraters, output streams for logging/exception handling, dynamic object relationship classes and the like.

The base layer 140 contains low level behavior information, i.e., field and stream IO and other fundamental system behavior. In addition, the base layer 140 includes the behavior obtained from used third party software. This includes the distribution of processing of the object request broker, object relational mapping facilities, and base classes in the Java/CORBA object request broker framework 42 (FIG. 2).

Figure 5:
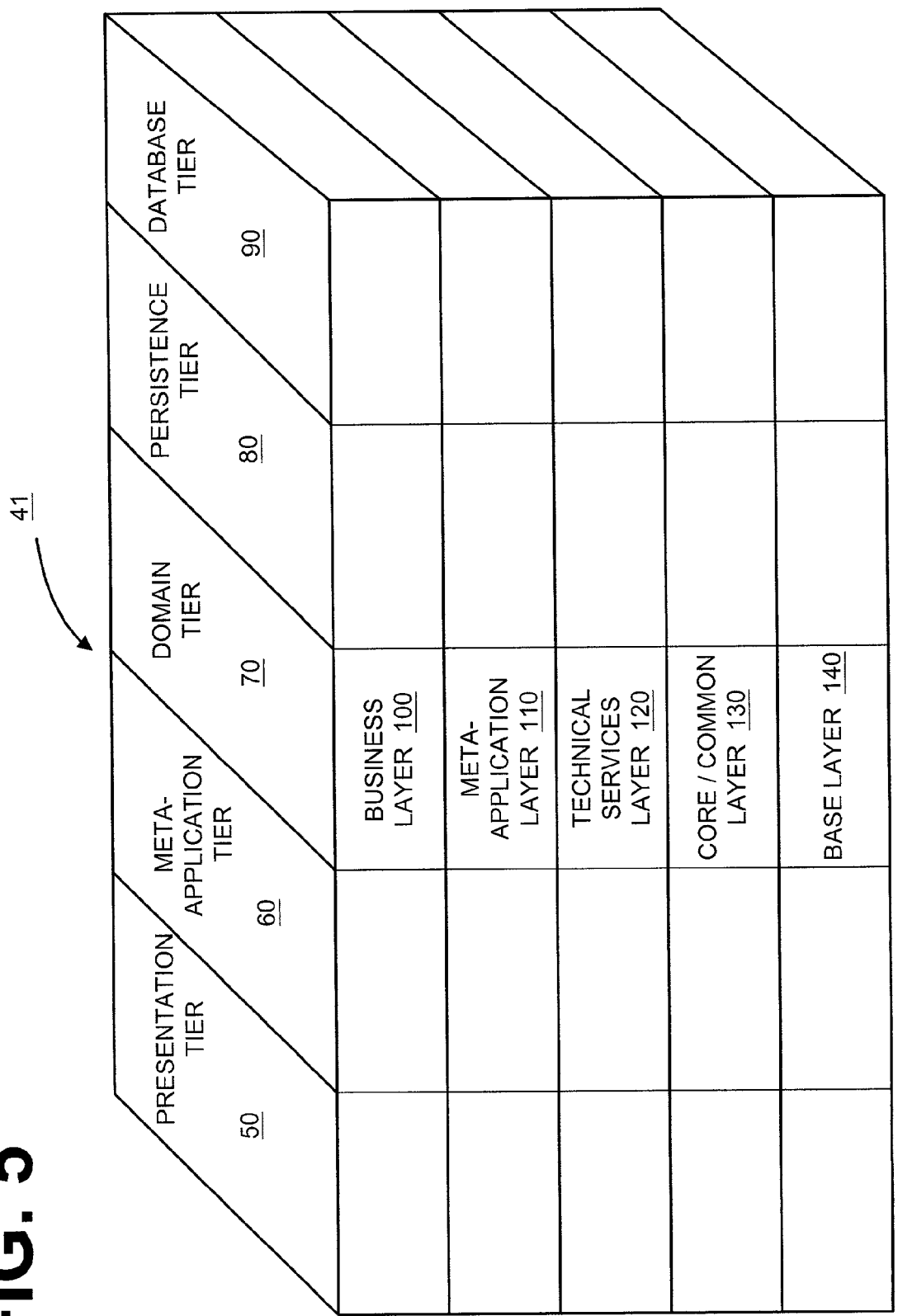
FIG. 5 is a block diagram is a block diagram of an example of the combined horizontal and vertical views of the logical architecture of the technical framework utilized by the present invention, as shown in FIGS. 3 and 4.

Illustrated in FIG. 5 is an example of the combined horizontal tiers and vertical layers utilized in the technical framework to provide a two dimensional matrix providing the insulation of concerns for tier/layer elements, and thus provide a high degree of flexibility and security. This combined tier and layer structure is advantageous since its system is divided into at least two hierarchical arranged tiers corresponding to technical tasks.

Processes in different logical tiers can be executed simultaneously and independently from each other. Furthermore, a fine grain division into physical layers is possible. The further advantage of the combined tier and layer framework is that technical framework 41 (FIG. 2) comprises facilities to make the server 31 interface model available on the client side and thus to hide the employed communication technology from a client developer.

A layered and tiered approach of the technical framework 41 also provides the possibility of adding and replacing components so that a communication between a client 11 and a server 31 will not become obsolete and can offer varied or additional services without exchanging an entire system or through extensive modification. Thus, this enables system upgrades to be relatively simple and economical.

Figure 6:
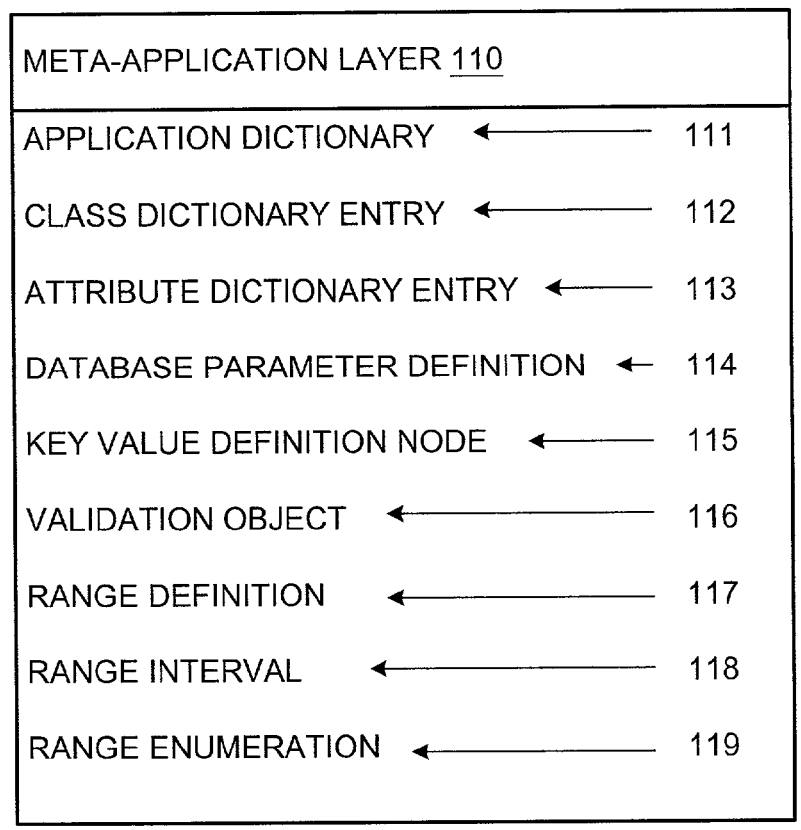
FIG. 6 is a block diagram illustrating the example of the parts of the Meta application of the present invention that is within the horizontal and vertical local architecture of the technical framework, as illustrated in FIGS. 2, 3, 4 and 5.

Illustrated in FIG. 6 is a block diagram illustrating an example of the parts of the Meta application of the present invention that are within the horizontal and vertical local architecture of the technical framework, as illustrated in FIGS. 2, 3, 4 and 5. The technical framework allows the definition of a large amount of information about an application, its classes and the attributes in the classes. This information is defined in a Meta application dictionary for the Meta application layer 110.

This Meta application dictionary 111 allows the dynamic configuration of application information and processing on a Meta level. The actual dictionary is represented by the application dictionary 111 instance, which functions as a root of the dictionary and in addition contains information about the application as an application. The application dictionary 111 instance includes information about the name of an application, the default language and the default locale of the application. The application dictionary 111 instance also contains a set of instances that define the Meta information for the classes.

Class Meta information is stored in the instances of the class dictionary entry 112. Class dictionary entry 112 instances contain information about the display name of a class, contain all the instances that describe the Meta information for the class's attributes, and contain the instance of a validation object that is used in the definition of the methods and their order for validating domain objects. There is one class dictionary entry instance of this class for every domain object in a system. Each class dictionary entry 112 contains a collection of attributes of dictionary entry 113 instances.

There is one class attribute dictionary entry 113 for each attribute in a domain object class for which the class dictionary entry exists. The attribute dictionary entry 113 defines information for the specification of attribute information on the Meta level, including a display name, and the length of a stringified attribute. Attribute dictionary entry 113 instance can optionally be used to specify the display mask of an attribute, i.e., to specify the format for a translation of an attribute value to and from a display including, but not limited to, currency signs, number of decimals, social security number, etc. The use of the display mask is dependent upon the acceptance of a standard for a mask definition.

The database parameter definition 114 instance contains attribute information regarding the applicable database. The database is not shown.

The validation of domain objects is done using an instance of the validate object 116 class. An instance of the validation object 116 exists for each class dictionary entry 112 instance, and it is associated with every instance of the domain object class for which the class dictionary entry 113 exists. The validation object 116 class is fairly simple and it contains an ordered collection of method names. Each of the method names must be a validation method in the associated domain object class and contain an validate method. A validate method is called automatically by the framework whenever an object is saved. It is called from an instance of a domain object which sends itself as a parameter. The validation object 116 then sends each validate message (method) in the collection to a domain name object instance, in the order specified. In this way, it is possible to dynamically configure the validation methods and their order for all domain objects.

For each attribute entry, it is possible to define a range definition 117 instance that defines the range for the attribute. There are currently two types of range definitions that are subclasses of the range definition 117 class. These two range definitions include the range interval 118 class and the range enumeration 119 class. Instances of the range interval 118 class allow the definition of the minimum and maximum values for an attribute. The range enumeration 119 class allows a definition of a list of allowable values for an attribute. There is a method in this class that checks whether the string specified as a parameter in the range enumeration 119 exists in the collection of allowable values for the instance. Using the information provided in the attribute dictionary entry 113 and range definition 117 classes, it is possible to provide a generic attribute validation mechanism.

The foregoing description has been presented for purposes of illustration and description. It is not intended to be exhaustive or to limit the invention to the precise forms disclosed. Modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for providing dynamic definition of an application object in a component framework environment, comprising:

means for providing a plurality of application dictionaries that contain information about the application object, one application dictionary for each client component and each server component in the component framework environment;

means for providing a class dictionary entry that defines meta information about the application object;

means for defining a list of allowable attributes to be changed to modify the definition of the application object;

means for modifying the application dictionaries to modify a definition of the application object;

means for validating the application dictionary modification; and means for saving the modified definition of the application object if the application dictionary modification is validated.

2. The system of claim 1, further comprising: means for determining the default location of the application object.

3. A method for providing dynamic definition of an application object in a component framework environment, the method comprising steps of:

providing a plurality of application dictionaries that contain information about the application object, one application dictionary for each client component and each server component in the component framework environment;

providing a class dictionary entry that defines meta information about the application object;

defining a list of allowable attributes to be changed to modify the definition of the application object;

modifying the application dictionaries to modify a definition of the application object;

validating the application dictionary modification; and saving the modified definition of the application object if the application dictionary modification is validated.

4. The method of claim 3, further comprising the step of: determining the default location of the application object.

5. A computer readable medium for providing dynamic definition of an application object, comprising:

logic for providing an application dictionary that contains information about the application object, including component pertinent information that allows a component to communicate with other components;

logic for providing a class dictionary entry that defines meta information about the application object;

logic for defining a list of allowable attributes to be changed to modify the definition of the application object;

logic for modifying the application dictionary to modify a definition of the application object;

logic for providing a range definition for each modifiable application object definition that specifies minimum and maximum values for the definition;

logic for validating the application dictionary modification; and logic for saving the modified definition of the application object if the application dictionary modification is validated.

6. The computer readable medium of claim 5, further comprising: logic for determining the default location of the application object.

7. A system for providing dynamic definition of an application object, comprising:
- an application dictionary that contains information about the application object, including component pertinent information that allows a component to communicate with other components;
- a class dictionary entry in the application dictionary that defines meta information about the application object;
- a list of allowable attributes to be changed to modify the definition of the application object;
- a modifier that modifies the application dictionary to modify a definition of the application object;
- a range enumeration definition defining a comprehensive list of allowable attribute values for each application object definitions;
- a validation mechanism that validates the application dictionary modification, the validation mechanism comprising a save mechanism that saves the modified definition of the application object if the application dictionary modification is validated.

8. The system of claim 7, wherein the application dictionary determines the default location of the application object.

* * * * *